W. PETERS.
CAKE MACHINE.
APPLICATION FILED APR. 9, 1921.
1,397,981.
Patented Nov. 22, 1921.
3 SHEETS—SHEET 3.
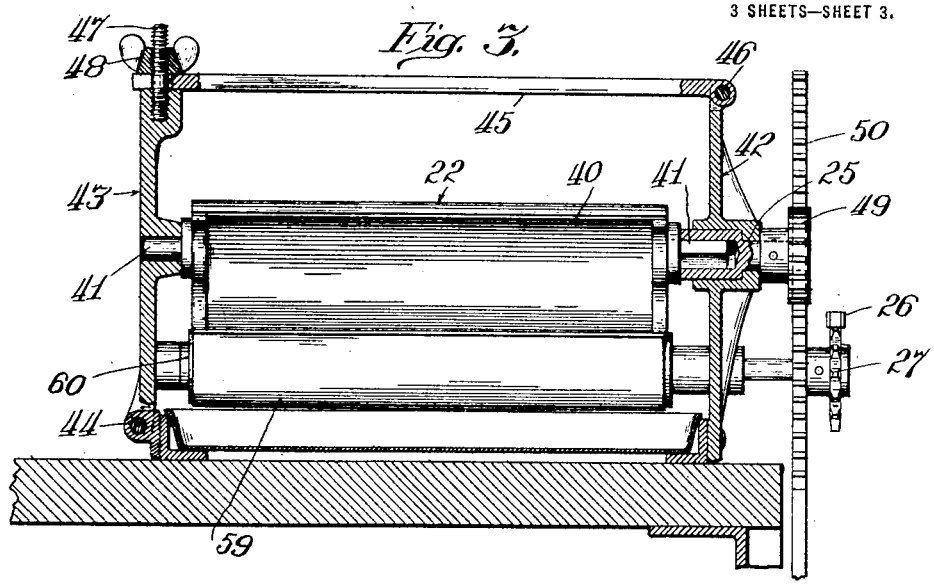
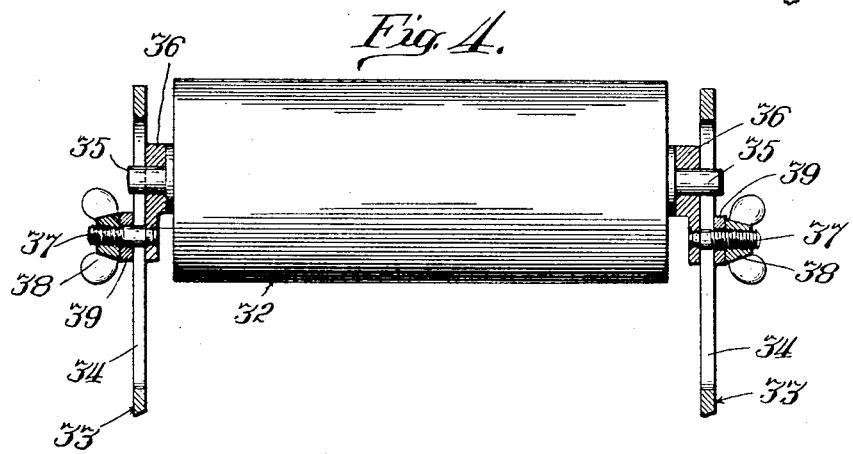
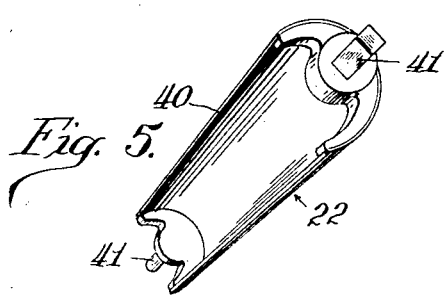
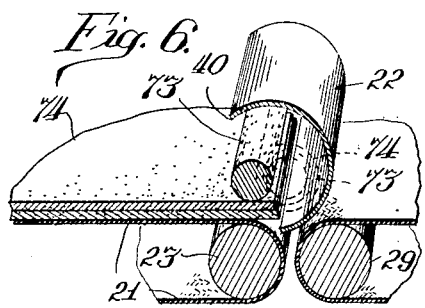
Inventor
Walter Peters,
By Heideman & Street
Attorneys
Witnesses
Milton Lenoir
G. W. Horrell

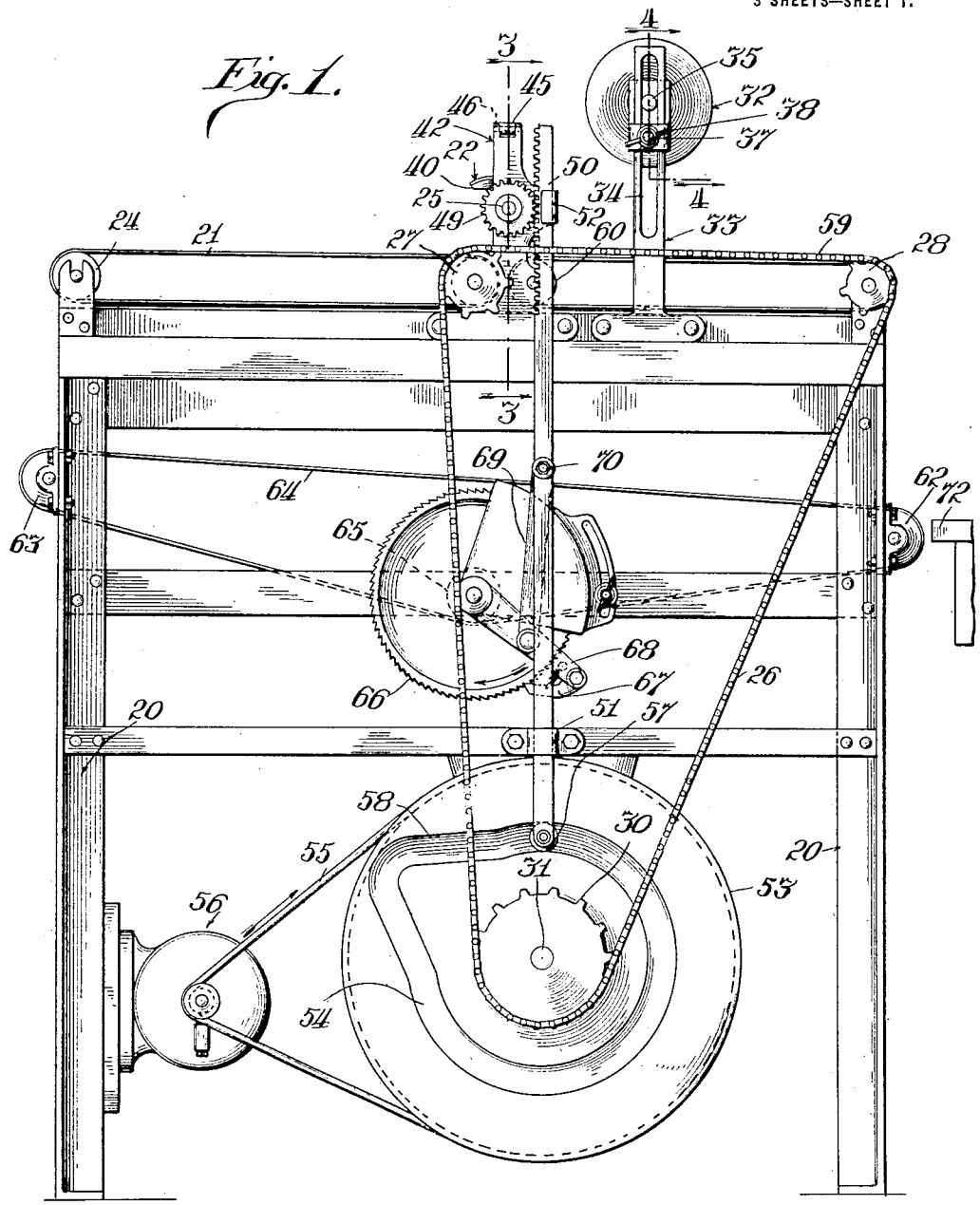

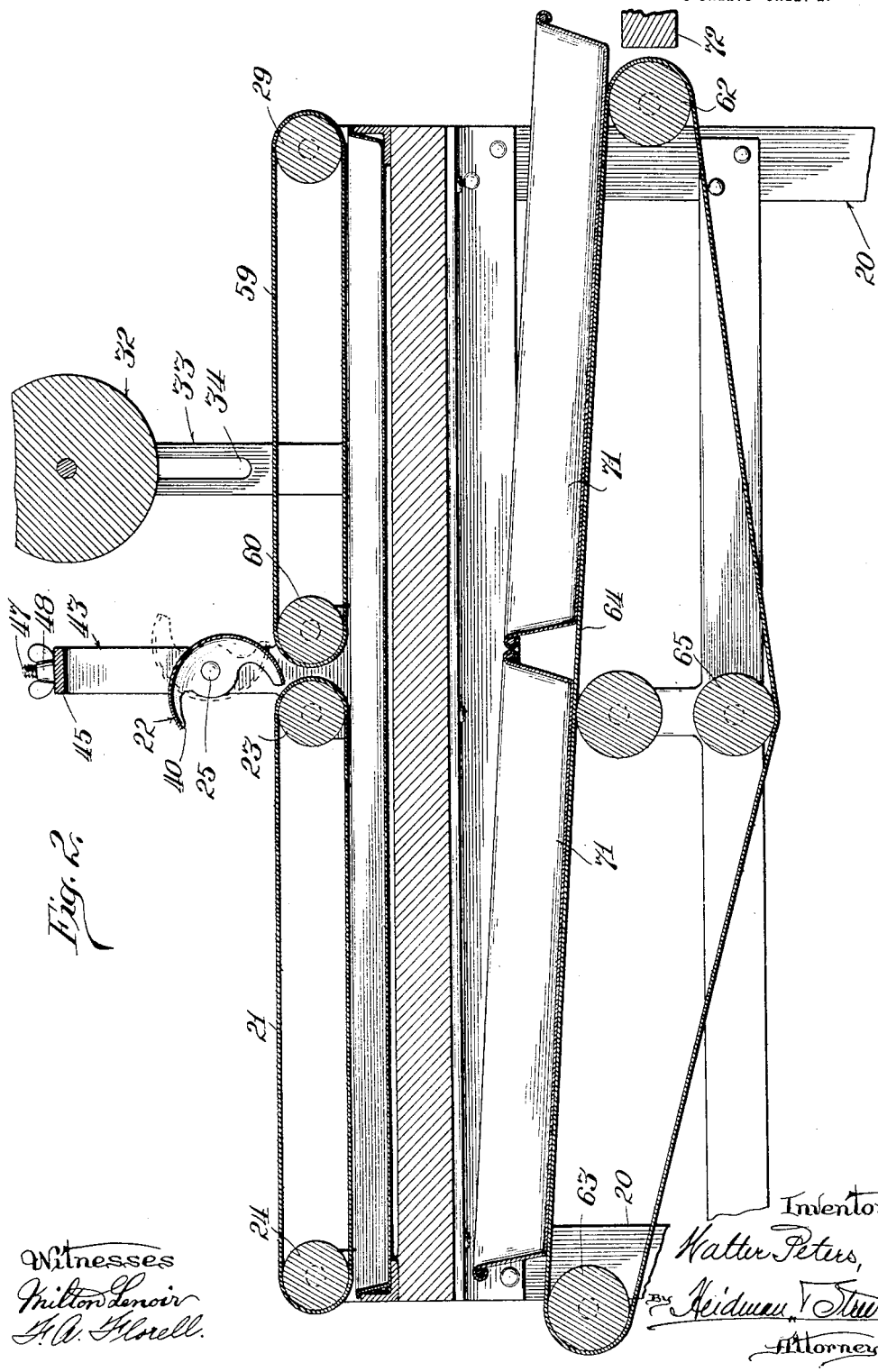

UNITED STATES PATENT OFFICE.

WALTER PETERS, OF CHICAGO, ILLINOIS.

CAKE-MACHINE.

1,397,981.  Specification of Letters Patent.  Patented Nov. 22, 1921.

Application filed April 9, 1921. Serial No. 459,849.

*To all whom it may concern:*

Be it known that I, WALTER PETERS, a citizen of the United States, and a resident of Chicago, in the county of Cook and State of Illinois, have invented certain new and useful Improvements in Cake-Machines, of which the following is a description, reference being had to the accompanying drawings, which form a part of my specification.

My invention relates to a machine for forming or making cakes and more particularly to cakes provided with a filler which is somewhat in the nature of a separate cake; that is to say my improved machine is intended to form a cake by rolling and infolding a cylindrical cake or filler element with an outer layer or wrapper disposed thereabout, whereby a two-fold cake or binary product of cylindrical form is produced.

The objects as well as the advantages of my improved construction will be more readily apparent from the detailed description of the accompanying drawings, wherein:—

Figure 1 illustrates my invention in side elevation.

Fig. 2 is an enlarged longitudinal sectional view of the upper or operating portion of the machine; with certain portions broken away.

Fig. 3 is a detail sectional view taken substantially on the line 3—3 of Fig. 1 looking in the direction of the arrows.

Fig. 4 is a detail sectional view taken on the line 4—4 of Fig. 1 looking in the direction of the arrows.

Fig. 5 is a detail view in perspective of the outer layer or wrapper controlling element.

Fig. 6 is a more or less schematic view, showing portions of the mechanism in perspective to illustrate the manner of operation.

The purpose of my invention is to provide a machine for automatically applying an outside layer or wrapper of cake dough to a previously formed cake or filler element; the outer and inner portions of the binary cake being previously partially baked or in dough-baked condition so as to be of more or less rigid consistency for handling; the composite or two-fold cake being subsequently conveyed to an oven and completely baked and put into edible condition.

As an exemplification of a machine embodying my invention and which is adapted to perform the functions ascribed, I illustrate in Fig. 1 a suitable supporting frame 20 composed of uprights and cross-members so as to provide support for the various operating elements hereinafter to be described.

My invention contemplates the provision of means, illustrated in the form of an endless belt or member 21 on which is to be placed the filler element or inner cake, of cylindrical form, superposed on the outer layer or flat cake; the superimposed cake units being thereby automatically fed toward the infolding or wrapping mechanism which is illustrated in the nature of an open sided cylindrical member 22. The endless element or belt 21 is disposed about a pair of rollers 23, 24 (see Fig. 2); the roller 24 being shown disposed adjacent to one side of the supporting frame; while the roller 23 is disposed at a point intermediate of opposite sides of the machine and slightly to one side of and in a plane beneath the pivotal point 25 of the member 22. The material is intended to be placed onto the receiving or outer end of the endless member 21 by an operator in the superposed relation previously mentioned and thence conveyed by said element or belt toward the infolding or wrapping member 22 and received thereby. The endless element 21 may be driven in any suitable manner, as for example by means of a belt or sprocket chain 26 disposed about a pulley or sprocket 27 secured to the journal of the roller 23; and the belt or chain 26 may be arranged to also drive a sprocket 28 secured to the trunnion of a roller 29 which is rotatably mounted adjacent to the opposite end or side of the machine and preferably in the same horizontal plane as rollers 23, 24; the chain 26 being also disposed about a sprocket-wheel 30 secured on a journal or driven shaft 31 suitably mounted in the lower part of the supporting structure or frame of the machine.

Disposed at a point intermediate of the one side or end of the machine and the center thereof, is a pressure-applying roller or member 32 which is of length commensurate with the width of the table or upper portion of the machine, that is to say commensurate with the width of the endless element or elements traveling along the top of the machine and adapted to receive the product operated on. The roller 32 is suitably journaled at opposite ends in a pair of uprights or brackets 33, 33 which are suitably secured to the side frame of the machine and disposed vertically above the surface or strand of an endless element later described; the upper ends of the brackets 33 being provided with elongated slots 34 to receive the trunnions 35 of the pressure roller 32.

In the particular exemplification of the invention, the trunnions 35 are shown provided with bearing blocks as at 36, see Fig. 4, which in turn are provided with threaded stems 37 adapted to be disposed through the slots 34, with the outer ends of the stems provided with suitable clamping means shown in the nature of butterfly nuts 38 and suitable washers 39 whereby the bearing blocks with the pressure roller may be clamped in any adjusted position intermediate of the ends of the slot 34 in the standards or brackets 33, thus enabling the roller 32 to be positioned relative to the top of the machine and therefore commensurate with the thickness of the product which is being operated on.

The cylindrical member 22 has a segment cut away throughout the length thereof so as to provide an opening 40 throughout its entire length, as shown in Figs. 3 and 5; while the ends of the cylindrical member 22 are provided with suitable trunnions as at 41 whereby the cylinder is mounted in a suitable frame disposed upwardly from the main frame of the machine as shown in Fig. 1; one of said trunnions 41 being squared as shown in Fig. 5 to enable power transmitting means to be readily applied thereto. The cylinder supporting frame preferably consists of the side members 42 and 43 having apertured bosses for the trunnions of the cylinder; the side member 42 being stationarily secured in vertical position, while the lower end of the side member 43 is preferably pivotally mounted at 44 to the base portion of the frame, thus permitting the side member 43 to be swung through the arc of a vertically disposed circle, namely toward and away from the cylindrical member 22. In order that the uprights or side members 42 and 43 may be rigidly held in vertical position, I provide a cross-brace 45, which is shown pivotally secured at 46 to the upright or side member 42, while the other end thereof is removably secured to the upper end of the side or upright 43, in any suitable manner, as for example by the threaded pin or screw 47 secured in the upright or side member 43 and disposed through an opening in the cross-brace 45; the cross-brace being clamped firmly in place by means of a butterfly or other suitable nut indicated at 48. In thus forming the supporting frame for the cylindrical member 22 it is apparent that the latter may be removed upon releasing the cross-brace 45, through the removal of the nut 48, which will permit the side frame or member 43 to be swung downwardly away from the cylindrical member; the construction also enabling the easy mounting of the cylindrical member in place.

The squared trunnion 41 of the cylindrical member 22 is provided with a gear or pinion 49 which is adapted to mesh with a rack-bar 50. The rack-bar 50 is reciprocatingly mounted, preferably at one side of the machine, by means of suitable straps or brackets as at 51 and guide member 52 which maintain the rack-bar in proper position relative to the pinion 49. Mounted on the driven shaft 31 so as to rotate therewith is a pulley 53 which is provided on one side with a circumferentially disposed cam groove 54; the pulley 53 being shown driven by a suitable belt or chain as at 55 which in turn is driven from the armature shaft of a suitable electric motor 56 mounted in the lower part of the machine-frame as shown in Fig. 1. The cam groove 54 is adapted to receive a roller 57 secured to the lower end of the rack-bar 50. With this construction, it is apparent that when the cam or offset portion 58 of the groove 54 is brought into position to receive the roller 57 on the lower end of the rack-bar 50, or rather when the roller 57 is caused to ride in the offset portion of the groove 54, the rack-bar is first reciprocated upwardly to an extent corresponding with the degree or length of one side of offset 58 of the cam groove 54 and thence reciprocated downwardly to a corresponding degree, while no reciprocatory movement will be given to the rack-bar 50 when the roller 57 is riding in the major or circular portion of the cam groove. The cylindrical member 22, with its pinion 49, is so positioned relative to the rack-bar 50 or correlated thereto, that the initial end of the offset or cam portion 58 of the cam groove 54 will oscillate the cylindrical member 22 a degree sufficient to present the open side 40 thereof toward the discharging end of the machine, namely toward the endless element 59; the normal position of the cylindrical member being such that the longitudinal edge of the cylindrical wall will be disposed slightly beneath the plane of the endless element 21 so that the material may readily pass into the cylindrical member 22. The cylindrical member is of such diameter and internal circumference that it will entirely receive, not only the inner cake or filler element but also the outer layer or flat cake before the rack-bar 50 will be reciprocated in upward direction by reason of the engagement of roller 57 in the initial portion or side of the cam groove, whereby the rack-bar 50 is reciprocated as stated, thereby causing the cylindrical member 22, as it is illustrated in Figs. 1 and 2, to rotate in counterclockwise direction and the contents of the cylindrical member thereby discharged onto an endless element or belt 59 which is disposed about the roller 29 and a roller 60 located adjacent to the roller 23 in proximity to the center of the machine. The discharged product is then caused to travel with the endless element or belt 59 toward the roller 29 and therefore beneath the pressure-applying roller 35 whereby the outer layer or wrapper may be given slight pressure, when necessary, to maintain its encircling relation with the inner filler or cake; the rolled or formed product being then discharged from the endless element or belt 59 into suitable pans which are then placed into an oven for the purpose of being completely or finally baked.

The supporting frame of the machine is also shown provided with pulleys or rollers 62 and 63 located at opposite ends of the machine as shown in Fig. 1; these rolls being adapted to receive an endless element or belt 64 thereabout; the endless element or belt being driven by means of a roller or pulley 65 which is provided with or secured on the same shaft as a ratchet wheel 66. The ratchet wheel 66 is actuated by means of a spring-controlled pawl 67 pivotally mounted on the end of an arm 68 which latter is shown loosely mounted on the axis or shaft of the ratchet wheel 66 so as to permit movement of the arm 68 independent of movement of the ratchet wheel 66. The arm 68 has pivotally secured thereto a link 69 which is also pivotally secured at 70 to the rack-bar 50. With this construction it is apparent that the endless belt 64 will be intermittently driven at a predetermined speed through the reciprocation of the rack-bar; that is to say the ratchet wheel 66, as illustrated in Fig. 1, will be driven in clockwise direction through the downward oscillation of arm 68 resulting from the downward reciprocation of rack-bar 50; the pawl 67 being free to ride over the teeth of the ratchet wheel 66 during the upward movement of both arm 68 and rack-bar 50.

The endless belt 64 is intended to receive suitable baking pans as at 71 in Fig. 2 which are adapted to receive the completely formed product as it leaves the endless belt 59; the belt 64 with a pan 71 being adapted to travel toward the right in Figs. 1 and 2, thereby discharging the pans 71 through the side of the machine at a point just beneath the place where the completely formed product leaves the belt 59; while the pans, in turn, are allowed to discharge onto any suitable stand or table, a portion whereof is indicated at 72 in Figs. 1 and 2. By driving the belt 64 in the manner shown and described, the receiving pans 71 will be intermittently fed at a speed commensurate with the speed of operation of infolding or rolling the outer layer or cake about the inner unit and discharging the dual product as previously described.

It will be understood that my machine is intended for use in connection with cakes and the like while the latter are still in a more or less plastic or dough-baked condition so that the outer layer or cake will be sufficiently pliable to permit the same to follow the inner surface of member 22 and thus encircle or incase the partially baked inner cake or filler element; the binary cake eventually being completely baked and put into edible condition. The inner cake or filler element which has been previously formed into somewhat cylindrical form, as indicated at 73 in Fig. 6 (and which may have been previously partially baked) is placed on top of the outer layer or cake 74 (which is in plastic or dough-baked condition); the inner element 73 being preferably disposed adjacent one end of the outer layer 74 as shown in Fig. 6 so that when the superposed elements enter the open sided cylindrical member 22, they will be caused to roll upon themselves through the continued inward movement induced by the movement of the endless belt 21 toward the cylindrical element 22, with the result that the inner element or cake 73 will be incased within the outer cake or layer 74, as shown in dotted lines in Fig. 6. The cam-groove 54 and the ratio between the rack-bar 50 and pinion 49, together with the size of cylindrical member 22 and its longitudinal opening 40, are all so correlated that a complete encircling of the inner element or cake by the outer element or layer is induced before the cylindrical member 22 has been oscillated so as to dispose the open side 40 thereof toward the discharge side of the machine, namely toward the discharge belt 59.

With certain pastries, the pressure roller 32 may not be required and might be objectionable, at which time the pressure applying roller 32 is moved to the upper end of the slots 34 in the standards 33 so as not to contact with the product discharging onto the belt 59. On the other hand, where it is desired to form a pastry having an outer layer of double thickness, the pastry discharging from the cylindrical member 22 in cylindrical form, is then flattened out by passing it beneath the roller 32 after the latter has been adjusted into proper position adapted to provide the degree of pressure desired for the purpose of rolling out or flattening the cylindrical product to the required form or thickness.

With the machine constructed as shown and described, the cylindrical member 22 may be readily removed and another member of different dimensions substituted therefor, at which time, of course, the ratio of the pinion 49 to the rack-bar must be altered to compensate for the differences in size of the cylindrical member so that the cylindrical member will be oscillated or partially rotated at the proper moment relative to the speed of travel of the receiving or feeding belt 21.

I have shown and described a construction which I believe exemplifies my invention in simple form and the terms and expressions employed are merely used as terms of description and not of limitation, as there is no intention in the use of such terms and expressions of excluding any mechanical equivalents for the respective features shown and described, as certain structural modifications are possible and may be made without, however, departing from the spirit of my invention.

What I claim is:—

1. A machine of the character described, comprising a traveling feed member, a traveling discharge member, both arranged substantially in alinement with each other, an open sided cylindrical shell disposed transversely of the members at a point in proximity to the adjacent ends of said members, the cylindrical shell being so arranged that one of its longitudinal edges of the open side will be disposed substantially in alinement with the first mentioned feed member when said shell is in one position, while the other longitudinal edge of the open side of said shell will be substantially in alinement with the second mentioned member when said shell is in a second position, means whereby said shell will be oscillated a predetermined degree, and power-imparting means whereby said last mentioned means is actuated.

2. A machine of the character described, comprising an endless receiving belt, an endless discharging belt, both arranged substantially in the same horizontal plane in alinement with each other and adapted to travel in a similar direction, a segmental shell disposed in a direction transversely of said belts and at a point in proximity to the adjacent ends of said belts so that a portion of the inner perimeter of said shell will be disposed substantially in the same plane as the receiving belt when the shell is in one position and with the discharging belt when the shell is in a second position, a driving member rotatably mounted in the machine and adapted to be driven from a suitable source of power, and rack and pinion mechanism intermediate of said driving member and said segmental shell whereby the latter is intermittently oscillated.

3. A machine of the character described, comprising a pair of endless belts arranged substantially in alinement with each other and constituting, respectively, a feeding belt and a discharging belt, an elongated segmental member rotatably mounted in proximity to the adjacent ends of both of said belts, adapted to receive the material from the feeding belt and cause it to travel circumferentially about the inner face of the member, driving mechanism for said feeding and discharging belts, and means intermediate of said driving mechanism and said segmental member whereby the latter will be oscillated at predetermined moments relative to the speed of travel of said belts.

4. A machine of the character described, comprising means for feeding the material to be operated on, rotatably mounted means for receiving the material from said first means and causing the material to move through a circumferential path into cylindrical form, means disposed adjacent to the second means for receiving the formed material therefrom, driving mechanism whereby the first and third mentioned means are actuated at substantially the same speeds, and means intermediate of the driving mechanism and said second mentioned means, whereby the latter will be intermittently rotated.

5. A machine of the character described, comprising a supporting frame, means movably mounted in the frame for feeding the material to be operated on, means rotatably mounted in the frame transversely of said feeding means, adapted to receive the material and cause it to move through a circumferential path into cylindrical form, means movably mounted in the frame for receiving the formed material from the second means and for conveying same to a predetermined point, tray-carrying means located in the supporting frame beneath all of said previously mentioned means, whereby a material receiving tray is conveyed beneath the discharging end of said third mentioned means, driving mechanism whereby said first and third mentioned means are actuated, means intermediate of the driving mechanism and said second means whereby the latter may be intermittently rotated, and means intermediate of said last means and the tray-carrying means whereby the latter wil be actuated at predetermined moments in the operation of said last mentioned means.

6. A machine of the character described, comprising a pair of endless belts arranged substantially in alinement with each other to constitute, respectively, a feeding belt and a discharging belt, means whereby said belts may be driven at substantially the same speed, an elongated segmental member rotatably mounted in proximity to the adjacent ends of both belts, adapted to receive the material from the feeding belt and cause it to travel through a circumferential path and to assume cylindrical shape, tray-carrying means movable longitudinally beneath the pair of belts whereby a material receiving tray may be conveyed beneath the discharge end of the discharging belt, driving mechanism whereby the pair of endless belts are actuated, means intermediate of the driving mechanism and said segmental member whereby the latter may be intermittently rotated, and means intermediate of said last means and the tray-carrying means, whereby the latter will be actuated at predetermined moments in the operation of said last mentioned means.

7. A machine of the character described, comprising a pair of endless elements arranged to travel substantially in alinement with each other from one side of the machine to the other and constituting, respectively, a feeding element and a discharging element, a hollow cylindrical member rotatably mounted so as to have its perimeter disposed intermediate of the two endless elements and arranged transversely thereof, said member being provided with a longitudinal opening in the perimeter thereof, driving mechanism whereby said endless elements may be actuated, and means intermediate of said driving mechanism and the hollow cylindrical member whereby the latter is intermittently oscillated so as to present the longitudinal opening therein alternately toward both of said elements.

8. A machine of the character described, comprising a pair of endless elements arranged to travel substantially in alinement with each other from one side of the machine to the other, to constitute, respectively, a feeding element and a discharging element, a hollow cylindrical member rotatably mounted so as to have its perimeter disposed intermediate of the two endless elements and arranged transversely thereof, said member being provided with a longitudinal opening in the perimeter thereof, pressure applying means adjustably mounted above one of said endless elements, driving mechanism whereby said endless elements may be actuated, and means intermediate of said driving mechanism and the hollow cylindrical member whereby the latter is intermittently oscillated so as to dispose the longitudinal opening therein alternately toward both of said elements.

9. A machine of the character described, comprising a pair of endless belts arranged substantially in alinement with each other to constitute, respectively, a feeding belt and a discharging belt, means whereby said belts may be driven at substantially the same speed, a hollow cylindrical member rotatably mounted so as to have its perimeter disposed intermediate of said belts and arranged transversely thereof, said member being provided with a longitudinal opening in the perimeter thereof and adapted to receive the material from the feeding belt, pressure applying means adjustably mounted above one of said belts, tray-carrying means mounted beneath said belts so as to extend beneath the discharging end of the discharge belt, driving mechanism whereby said belts may be actuated, means intermediate of said driving mechanism and the hollow cylindrical member whereby the latter is intermittently oscillated so as to alternately dispose the longitudinal opening therein toward both belts, and pawl and ratchet mechanism intermediate of the last mentioned means and the tray-carrying means whereby the latter will be periodically actuated during operation of said last mentioned means.

WALTER PETERS.

Witnesses:
 G. HEIDMAN,
 F. A. FLORELL.